United States Patent
Dumont et al.

(10) Patent No.: US 7,423,234 B2
(45) Date of Patent: Sep. 9, 2008

(54) PROCESS FOR THE SURFACE TREATMENT OF AN ARTICLE CONTAINING SILICONE CROSSLINKED BY POLYADDITION

(75) Inventors: Laurent Dumont, La Motte Servolex (FR); Alain Pouchelon, Meyzieu (FR)

(73) Assignee: Rhodia Chimie, Boulogne-Billancourt (FR)

( * ) Notice: Subject to any disclaimer, the term of this patent is extended or adjusted under 35 U.S.C. 154(b) by 340 days.

(21) Appl. No.: 10/518,344

(22) PCT Filed: Jun. 17, 2003

(86) PCT No.: PCT/FR03/50013

§ 371 (c)(1),
(2), (4) Date: Jan. 4, 2006

(87) PCT Pub. No.: WO03/106145

PCT Pub. Date: Dec. 24, 2003

(65) Prior Publication Data

US 2006/0157453 A1    Jul. 20, 2006

(30) Foreign Application Priority Data

Jun. 17, 2002 (FR) ................................. 02 07443

(51) Int. Cl.
*B23K 10/00* (2006.01)
(52) U.S. Cl. ............................ 219/121.47; 219/121.59; 219/121.5; 219/121.48
(58) Field of Classification Search ............ 219/121.59, 219/121.36, 121.48, 121.5, 74, 75, 121.44, 219/121.52, 121.47
See application file for complete search history.

(56) References Cited

U.S. PATENT DOCUMENTS

| | | | |
|---|---|---|---|
| 4,163,082 A | 7/1979 | Romenesko | 428/447 |
| 4,508,606 A | 4/1985 | Andrade et al. | 204/169 |
| 4,791,029 A | 12/1988 | Fau et al. | 428/447 |
| 4,874,671 A | 10/1989 | Tahara et al. | 428/447 |
| 5,147,397 A | 9/1992 | Christ et al. | 623/6 |
| 5,364,662 A | 11/1994 | Domenico et al. | 427/536 |
| 5,506,302 A | 4/1996 | Shiono et al. | 524/731 |
| 5,827,921 A | 10/1998 | Osawa et al. | 524/837 |
| 5,998,536 A | 12/1999 | Bertry et al. | 524/557 |
| 6,265,690 B1 | 7/2001 | Förnsel et al. | 219/121.5 |
| 2002/0012756 A1 | 1/2002 | Kuckertz et al. | 427/569 |
| 2002/0061365 A1 | 5/2002 | Grape et al. | 427/387 |

FOREIGN PATENT DOCUMENTS

DE            199 46 252            4/2001

(Continued)

*Primary Examiner*—Mark H Paschall
(74) *Attorney, Agent, or Firm*—James C. Lydon

(57) ABSTRACT

A process for increasing the surface tension ("wettability") of a silicone element crosslinked by polyaddition from a liquid composition containing one or more α,ω-dimethylvinylpolydimethylsiloxanes (PDMS), one or more poly(dimethyl)(methylhydrogenosiloxy)-α,ω-dimethylhydrogenosiloxanes, and a platinum crosslinking catalyst. The silicone surface is treated with a homogeneous atmospheric plasma using a plasma spraying apparatus having a rotating head with one or more plasma nozzles that are offset relative to the axis of rotation, each one being capable of generating a plasma jet whose axis is parallel to said axis of rotation. The articles to which the invention relate include composites of flexible substrate (e.g. textile)/silicone coating. Application: adhesive bonding of silicone surfaces crosslinked by ≡Si—H/≡Si-vinyl polyaddition.

18 Claims, 1 Drawing Sheet

FOREIGN PATENT DOCUMENTS

| | | |
|---|---|---|
| EP | 0 431 979 | 6/1991 |
| EP | 0 647 477 | 4/1995 |
| EP | 0 702 068 | 3/1996 |
| EP | 0 712 956 | 5/1996 |
| EP | 0 819 735 | 1/1998 |
| EP | 0 659 857 | 4/1998 |
| EP | 0 866 164 | 9/1998 |
| EP | 0 643 106 | 12/1999 |
| EP | 1 078 823 | 2/2001 |
| FR | 2 617 760 | 1/1989 |
| GB | 2 045 824 | 11/1980 |
| JP | 03-122185 | 5/1991 |
| JP | 10-025698 | 1/1998 |
| WO | WO 95/19394 | 7/1995 |
| WO | WO 01/78891 | 10/2001 |

PROCESS FOR THE SURFACE TREATMENT OF AN ARTICLE CONTAINING SILICONE CROSSLINKED BY POLYADDITION

The invention relates to the field of articles containing elements made of silicone elastomer crosslinked by the polyaddition of ≡Si—H units onto ≡Si-alkenyl (preferably ≡Si-vinyl) units belonging to polyorganosiloxanes (POS).

These crosslinked elements are obtained from liquid silicone preparations which can be especially:

- POS compositions vulcanizable by polyaddition at room temperature (with possible activation at higher temperature) which are two-component (RTV II) or one-component (RTV) and advantageously have a viscosity at 25° C. of at most 200 Pa·s and preferably of between 10 and 100 Pa·s;
- POS compositions vulcanizable by polyaddition under the action of heat which are two-component or one-component, are called LSR and advantageously have a viscosity at 25° C. of between 100 and 1000 Pa·s;
- POS compositions vulcanizable by polyaddition under the action of heat (EVC) which advantageously have a viscosity at 25° C. of at least 1000 Pa·s and preferably of between 1000 Pa·s and 10,000 Pa·s.

Of particular interest within the framework of the invention are silicone articles of the following types:

- parts for the construction of silicone molds,
- subassemblies for the production of large parts,
- composites with monolayer or multilayer silicone coatings for the protection or mechanical strengthening of various flexible substrates, for example woven or non-woven fibrous substrates,
- very specific parts obtained by overmolding,
- assemblies of all these articles.

Since such articles containing silicone have to be assembled by adhesive bonding, those skilled in the art are faced with the problem of choosing the appropriate adhesive.

It is well known that it is virtually impossible to bond silicones with an organic adhesive. Assembly is only possible to a certain extent with silicone adhesives, but generally at the expense of a procedure which leaves a great deal to be desired.

This problem of the adhesive bonding of silicones is due to their very low surface energy, the result of which is that the majority of adhesives are not capable of wetting the silicone substrate satisfactorily. Consequently the cohesion provided by said bonding is extremely mediocre.

The need for the adhesive bonding of silicone is particularly apparent in the manufacture of multicomponent assemblies, such as bags for the individual protection of vehicle occupants (also called airbags), from composites consisting of flexible substrates, for example woven or non-woven fibrous substrates, and having multilayer silicone elastomer coatings useful as protection and/or mechanical strengthening.

Adhesive bonding is also very useful for the assembly of large engineering parts molded from silicone which cannot be obtained in a single casting, or for the repair of molds or damaged parts. Thus it is very often necessary to resort to treatments which, despite the practical complexity they create, do not always offer the assurance of success.

Now, to facilitate the adhesive bonding of surfaces made of silicone crosslinked especially by polyaddition, it is important to improve the "wettability" of such surfaces by increasing their surface tension.

Furthermore, it is known to carry out surface treatments on engineering parts or plastic films. These surface treatments, the purpose of which is to prepare these parts or plastic films for painting and adhesive bonding operations, are intended to remove the surface impurities and change the molecular structure of said surfaces so as to improve their "wettability" towards liquids such as an adhesive or a paint.

Thus the surface treatment of plastic engineering parts with a plasma is a currently available technology.

One illustration which may be given is American patent U.S. Pat. No. 5,837,958, which describes a process for the surface treatment of a plastic engineering part with a plasma discharge generated from a working gas, this plasma discharge forming a concentrated jet of a medium reactive towards the surface of the plastic engineering part to be treated. The surface of the engineering part to be treated is brushed with the plasma jet. Said patent further describes a concentrated jet generator for carrying out said surface treatment.

U.S. Pat. No. 6,265,690 discloses an apparatus for the plasma surface treatment of materials consisting of synthetic resins to which liquids consisting of adhesives or printing inks are to be applied. The purpose of the plasma surface treatment delivered by this apparatus is to improve the surface "wettability" of the resins in question by modifying the surface structure so as ultimately to increase the surface tension. The plasma spraying apparatus according to said patent is presented as enabling a rapid and effective continuous treatment of large surfaces. This apparatus comprises a rotating head having one or more plasma nozzles that are offset relative to the axis of rotation of the head, each one being capable of generating a plasma jet whose axis is parallel to said axis of rotation.

This technology, marketed under the name Plasma Treat®, is described as a process for the production of a zero-potential (grounded) homogeneous atmospheric plasma jet.

This plasma technology has never been applied to crosslinked silicones or, in particular, to polyorganosiloxanes crosslinked by ≡Si—H/≡Si-alkenyl (preferably ≡Si-vinyl) polyaddition.

Given this state of the art, one of the essential objects of the present invention is to propose an advantageous solution to the problem of the low surface energy ("wettability") of silicones, particularly silicones consisting of POS crosslinked by the polyaddition of ≡Si—H units onto ≡Si-alkenyl units.

Another essential object of the invention is to provide a process for the surface treatment of an article containing crosslinked silicone so as to facilitate the application of liquids, particularly adhesives, to the treated silicone surface.

Another essential object of the invention is to provide a process for the production of a crosslinked silicone article which has been treated so as to increase its surface tension without detracting from the mechanical properties and/or hydrophobic properties and/or oleophobic properties and/or esthetic qualities of the crosslinked silicone elements.

Another essential object of the present invention is to provide a process for the assembly of articles containing crosslinked silicone which has been pretreated so as to increase the surface tension of the silicone and facilitate the application of adhesive.

Another of the inventors' objectives was to develop a composite consisting of a flexible substrate (especially fibrous substrate, e.g. textile or polymer substrate) covered with a multilayer coating of crosslinked silicone elastomer, whose surface possesses a high surface tension and hence a good wettability towards liquids such as adhesives or paints, as well as a high adhesive strength (measured by an adhesive bonding test T), said coating furthermore having a good cohesion, good mechanical properties, a good crumple resistance, the usual hydrophobic/"oleophobic" properties of silicones, and a good external appearance.

These and other objects are achieved by the present invention, which relates first and foremost to a process for the surface treatment of an article containing crosslinked silicone, preferably selected from polyorganosiloxanes (POS) crosslinked by the polyaddition of ≡Si-H units onto ≡Si-alkenyl (preferably ≡Si-vinyl) units, obtained from a silicone preparation comprising:

- at least one polyorganosiloxane (POS) A with ≡Si-alkenyl (preferably ≡Si-vinyl) units,
- at least one polyorganosiloxane (POS) B with ≡Si—H units,
- at least one metal catalyst C, preferably based on platinum,
- optionally at least one POS resin D carrying ≡Si-alkenyl (preferably ≡Si-vinyl) units,
- optionally at least one crosslinking inhibitor E,
- optionally at least one adhesion promoter F,
- optionally at least one mineral filler G,
- optionally at least one functional additive H for imparting specific properties, characterized in that:

it consists essentially in spraying at least one plasma jet onto at least part of the silicone surface of said article,
the plasma used is a homogeneous atmospheric plasma,
and it is carried out continuously by means of a plasma spraying apparatus comprising a rotating head having one or more plasma nozzles that are offset relative to the axis of rotation, each one being capable of generating a plasma jet whose axis is parallel to said axis of rotation.

It is to the inventors' credit to have found that a cold plasma treatment of the crosslinked silicone surface to be assembled makes it possible to achieve good adhesive performance characteristics, especially by improving the wettability of the crosslinked silicone surface, enabling adhesive to spread well.

This atmospheric cold plasma results from an electrical discharge in a gas, which is thereby activated and sweeps over the crosslinked silicone surface to be treated.

"Cold plasma" is understood in terms of the invention as meaning low temperatures, particularly temperatures below 100° C. and in practice below 50° C., at the point of contact with the substrate.

Hitherto this technology has only been used in the field of the cleaning and surface modification of thermoplastic, thermosetting, elastomer, composite, ceramic and metallic materials. This surface modification is presented as allowing cleaning, an increase in surface tension, electrostatic neutralization, the creation of functional groups, and an increase in bonding sites.

It is particularly surprising to find, like the inventors, that these plasma surface treatments, when applied to crosslinked silicone, make it possible to improve adhesion, especially by increasing the surface tension ("wettability" by adhesive liquids in particular).

According to one preferred modality of the invention, the plasma used is a homogenous atmospheric plasma, i.e. a plasma that is continuous over time and uniform on the surface. The plasma is furthermore of high intensity.

According to a particularly preferred modality of the invention, the plasma surface treatment process is carried out continuously by means of a plasma spraying apparatus comprising a rotating head having one or more plasma nozzles that are offset relative to the axis of rotation, each one being capable of generating a plasma jet whose axis is parallel to said axis of rotation.

For further details on this subject, reference may be made to American patent U.S. Pat. No. 6,265,690.

The Plasma Treat® technology, marketed by the company of the same name, may be mentioned as an example of plasma technology applying the preferred mode of carrying out the invention, referred to above.

According to another of its features, the present invention relates to a process for the production of a crosslinked silicone article which has been treated with a plasma as indicated above, this process being characterized in that it comprises the following essential steps:

(I) forming a silicone element with a liquid silicone preparation as defined above;
(II) crosslinking this liquid silicone preparation formed in step (I);
(III) treating at least part of the crosslinked silicone surface with a plasma;
(IV) repeating steps (I) and (II).

A possible advantageous variation of such a process for the manufacture of plasma-treated crosslinked silicone articles is a process for the monolayer or multilayer silicone coating of any substrates, for example a fabric, a nonwoven or a polymer film.

In such a case, the article containing silicone includes a preferably flexible substrate and one or more crosslinked silicone elements forming a monolayer or multilayer coating adhering to the substrate.

In the case where mass crosslinked silicone articles are involved, these can be e.g. silicone molds or silicone molded objects.

In the case of molded objects, steps (I) and (II) form part of a batch molding process.

These molded objects can be engineering parts which may or may not be intended to be joined together to form larger assemblies.

The latter can also correspond to a silicone mold produced in several steps, or to the repair of a worn-out mold requiring the assembly of repair parts.

Advantageously, the process for the plasma surface treatment of crosslinked silicone, whether or not it forms an integral part of a process for the production of articles containing crosslinked silicone, is carried out so that the quantity of plasma received by the silicone surface is such that the energy of said surface is greater than 30 mN/m and preferably between 30 and more than 70 mN/m.

Regulation of the intensity of the plasma applied to the crosslinked silicone surface is accessible to those skilled in the art, who can vary the distance separating the plasma torch and the surface to be treated, as well as the speed of travel and/or the exposure time of the surface to be treated.

The process according to the invention is not limited to a single repetition (IV) of the steps (II) for crosslinking of the silicone compositions to give composites (I) having only two silicone elastomer layers. In fact, it is understood that the application and crosslinking steps (I) and (II) can be repeated as many times as is necessary to obtain the number of desired silicone elastomer layers, care being taken to carry out the plasma treatment (III) over at least all the intermediate crosslinked layers, i.e. up to the last but one, to which the outer top layer is applied.

The present invention further relates to a process for the assembly of articles containing silicone preferably crosslinked by the polyaddition of ≡Si—H units onto ≡Si-alkenyl (preferably ≡Si-vinyl) units, characterized in that at least one of the articles to be assembled is derived from one of the processes defined above, and in that said articles are assembled using liquid adhesive which is applied to at least part of the treated silicone surfaces.

According to the noteworthy modalities of the invention, the chosen POS A have siloxy units of the formula $$W_a Z_b SiO_{(4-(a+b))/2} \quad (1)$$

in which:
the symbols W, which are identical or different, are each an alkenyl group and preferably a $C_2$-$C_6$ alkenyl;
the symbols Z, which are identical or different, are each a non-hydrolyzable monovalent hydrocarbon group that is devoid of an unfavorable action on the activity of the catalyst, is optionally halogenated and is preferably selected from alkyl groups having from 1 to 8 carbon atoms inclusive, and from aryl groups;
a is 1 or 2, b is 0, 1 or 2 and a+b is between 1 and 3;
optionally at least some of the other units are units of the empirical formula $$Z_c SiO_{(4-c)/2} \quad (2)$$

in which z is as defined above and c has a value of between 0 and 3.

A very large majority of the POS A can be formed of units of formula (1), or it can also contain units of formula (2). Likewise, they can have a linear structure. Their degree of polymerization is preferably between 2 and 5000.

Z is generally selected from methyl, ethyl and phenyl radicals, at least 60 mol % of the radicals Z being methyl radicals.

Examples of siloxy units of formula (1) are the vinyldimethylsiloxane unit, the vinylphenylmethylsiloxane unit and the vinylsiloxane unit.

Examples of siloxy units of formula (2) are $SiO_{4/2}$, dimethylsiloxane, methylphenylsiloxane, diphenylsiloxane, methylsiloxane and phenylsiloxane units.

Examples of POS A are dimethylpolysiloxanes with dimethylvinylsilyl ends, methylvinyldimethylpolysiloxane copolymers with trimethylsilyl ends, methylvinyldimethylpolysiloxane copolymers with dimethylvinylsilyl ends, and cyclic methylvinylpolysiloxanes.

The dynamic viscosity $\eta_d$ of this POS A is between 0.01 and 500 Pa·s and preferably between 0.01 and 300 Pa·s.

Preferably, the POS A comprises at least 98% of siloxy units D: —$R_2SiO_{2/2}$, where R is defined in the same way as Z, this percentage corresponding to the number of units per 100 silicon atoms.

Preferably, the alkenyl units W are vinyls carried by siloxy units D and optionally M and/or T.

The preferred POS B are selected from those comprising siloxy units of the formula $$H_d L_e SiO_{(4-(d+e))/2} \quad (3)$$

in which:
the symbols L, which are identical or different, are each a non-hydrolyzable monovalent hydrocarbon group that is devoid of an unfavorable action on the activity of the catalyst, is optionally halogenated and is preferably selected from alkyl groups having from 1 to 8 carbon atoms inclusive, and from aryl groups;
d is 1 or 2, e is 0, 1 or 2 and d+e has a value of between 1 and 3;
optionally at least some of the other units being units of the empirical formula $$L_g SiO_{(4-g)/2} \quad (4)$$

in which L is as defined above and g has a value of between 0 and 3.

Examples of POS B which may be mentioned are poly(dimethylsiloxy)-(methylhydrogenosiloxy)-α,ω-dimethylhydrogenosiloxane.

The POS B can be formed only of units of formula (3) or also contains units of formula (4).

The POS B can have a linear, branched, cyclic or network structure. The degree of polymerization is greater than or equal to 2 and more generally less than 100.

The dynamic viscosity $\eta_d$ of this POS B is between 5 and 1000 mPa·s and preferably between 10 and 500 mPa·s.

The group L is defined in the same way as the group Z above.

Examples of units of formula (3) are $H(CH_3)_2 SiO_{1/2}$, $HCH_3 SiO_{2/2}$ and $H(C_6H_5)SiO_{2/2}$.

Examples of units of formula (3) are the same as those given above for the units of formula (2).

Examples of POS B are:
dimethylpolysiloxanes with hydrogenodimethylsilyl ends,
copolymers containing dimethylhydrogenomethylpolysiloxane units with trimethylsilyl ends,
copolymers containing dimethylhydrogenomethylpolysiloxane units with hydrogenodimethylsilyl ends,
hydrogenomethylpolysiloxanes with trimethylsilyl ends,
cyclic hydrogenomethylpolysiloxanes,
hydrogenosiloxane resins containing siloxy units M: $R_3SiO_{1/2}$, Q: $SiO_{4/2}$ and/or T: $RSiO_{3/2}$, and optionally D: —$R_2SiO_{2/2}$, where R=H or is defined in the same way as L.

These groups can optionally be halogenated or they can be selected from cyanoalkyl radicals.

The halogens are e.g. fluorine, chlorine, bromine and iodine, chlorine or fluorine being preferred.

The POS A & B can consist of mixtures of different silicone oils.

These POS A & B can be:
RTV as defined above and in U.S. Pat. Nos. 3,220,972; 3,284,406; 3,436,366; 3,697,473 and 4,340,709;
LSR as defined above;
or EVC as defined above.

Preferably, the alkenyl groups W of the POS A and/or of the POS resins D are vinyl groups Vi carried by siloxy units D and optionally M and/or T.

The POS resins D will preferably be selected from those containing at least one alkenyl radical in their structure, said resin having an alkenyl group content of between 0.1 and 20% by weight and preferably of between 0.2 and 10% by weight.

These resins are well-known branched organopolysiloxane oligomers or polymers that are available commercially. They take the form of solutions and preferably siloxane solutions. Their structure contains at least two different units selected from those of the formulae $R'_3SiO_{0.5}$ (unit M), $R'_2SiO$ (unit D), $R'SiO_{1.5}$ (unit T) and $SiO_2$ (unit Q), at least one of these units being a unit T or Q.

The radicals R' are identical or different and are selected from linear or branched $C_1$-$C_6$ alkyl radicals, $C_2$-$C_4$ alkenyl radicals, phenyl radicals and 3,3,3-trifluoropropyl radicals. Examples of alkyl radicals R' which may be mentioned are methyl, ethyl, isopropyl, tert-butyl and n-hexyl radicals, and examples of alkenyl radicals R' which may be mentioned are vinyl radicals.

It must be understood that, in the POS resins D & D' of the aforementioned type, some of the radicals R' are alkenyl radicals.

Examples which may be mentioned of branched organopolysiloxane oligomers or polymers are resins MQ, resins MDQ, resins TD and resins MDT, it being possible for the alkenyl groups to be carried by the units M, D and/or T. Examples which may be mentioned of particularly suitable resins are vinylated resins MDQ or MQ having a vinyl group content of between 0.2 and 10% by weight, these vinyl groups being carried by the units M and/or D.

This structural resin is advantageously present in a concentration of between 10 and 70% by weight, preferably of between 30 and 60% by weight and particularly preferably of between 40 and 60% by weight, based on all the constituents of the composition.

The polyaddition reaction is well known to those skilled in the art. A catalyst must also be used in this reaction. This catalyst can be selected especially from platinum and rhodium compounds. In particular, it is possible to use the complexes of platinum and an organic product described in patents U.S. Pat. Nos. 3,159,601, 3,159,602 and 3,220,972 and European patents EP-A-0 057 459, EP-A-0 188 978 and EP-A-0 190 530, and the complexes of platinum and vinylated organosiloxanes described in patents U.S. Pat. Nos. 3,419,593, 3,715,334, 3,377,432 and 3,814,730. The generally preferred catalyst is platinum. In this case the amount of catalyst C, calculated as the weight of platinum metal, is generally between 1 and 400 ppm and preferably between 2 and 100 ppm, based on the total weight of the POS A & B.

Particularly in the one-component systems, the silicone elastomer preparations also comprise at least one retarder E of the addition reaction (crosslinking inhibitor) selected from the following compounds:

polyorganosiloxanes which are advantageously cyclic and substituted by at least one alkenyl, tetramethylvinyltetrasiloxane being particularly preferred, pyridine, organic phosphines and phosphites, unsaturated amides, alkylated maleates, and acetylenic alcohols.

These acetylenic alcohols (cf. FR-B-1 528 464 and FR-A-2 372 874), which are among the preferred thermal blockers of the hydrosilylation reaction, have the formula

R—(R')C(OH)—C≡CH in which:

R is a linear or branched alkyl radical or a phenyl radical;

R' is H, a linear or branched alkyl radical or a phenyl radical;

it optionally being possible for the radicals R, R' and the carbon atom in the α-position to the triple bond to form a ring;

the total number of carbon atoms present in R and R' being at least 5 and preferably 9 to 20.

Said alcohols are preferably selected from those having a boiling point above 250° C. Examples which may be mentioned are:

1-ethynylcyclohexan-1-ol;

3-methyldodec-1-yn-3-ol;

3,7,11-trimethyldodec-1-yn-3-ol;

1,1-diphenylprop-2-yn-1-ol;

3-ethyl-6-ethylnon-1-yn-3-ol;

3-methylpentadec-1-yn-3-ol.

These α-acetylenic alcohols are commercial products.

Such a retarder E is present in an amount of at most 3000 ppm and preferably in an amount of 10 to 2000 ppm, based on the total weight of the organopolysiloxanes A & B.

In one advantageous embodiment of the process according to the invention, it is possible to use an adhesion promoter F. This adhesion promoter F can comprise e.g.:

(F.1) at least one alkoxylated organosilane of the following general formula:

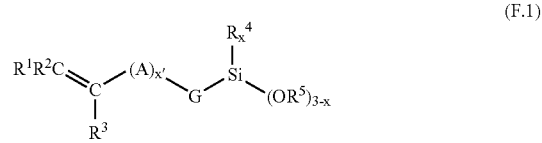

(F.1)

in which:

$R^1$, $R^2$, $R^3$ are hydrogenated or hydrocarbon radicals that are identical to or different from one another and are hydrogen, a linear or branched $C_1$-$C_4$ alkyl or a phenyl optionally substituted by at least one $C_1$-$C_3$ alkyl;

A is a linear or branched $C_1$-$C_4$ alkylene;

G is a valence bond;

$R^4$ and $R^5$ are identical or different radicals and are a linear or branched $C_1$-$C_4$ alkyl;

x'=0 or 1;

x=0 to 2, said compound (F.1) preferably being vinyltrimethoxysilane (VTMS);

(F.2) at least one organosilicon compound comprising at least one epoxy radical, said compound (F.2) preferably being 3-glycidoxypropyl-trimethoxysilane (GLYMO);

(F.3) at least one chelate of a metal M and/or a metal alkoxide of the general formula $M(OJ)_n$, where n=valency of M and J=linear or branched $C_1$-$C_8$ alkyl, M being selected from the group comprising Ti, Zr, Ge, Li, Mn, Fe, Al and Mg, said compound (F.3) preferably being tert-butyl titanate.

The proportions of (F.1), (F.2) and (F.3), expressed in % by weight based on the total of the three, are preferably as follows:

| | |
|---|---|
| (F.1) | ≧10, |
| (F.2) | ≧10, |
| (F.3) | ≦80. |

Furthermore, this adhesion promoter F is preferably present in an amount of 0.1 to 10%, preferably of 0.5 to 5% and particularly preferably of 1 to 2.5% by weight, based on all the constituents of the preparation.

The preparations used in the process according to the invention can comprise a filler G, which will preferably be a mineral filler. It can consist of products selected from siliceous (or non-siliceous) materials.

Siliceous materials can play the role of reinforcing or semi-reinforcing fillers.

Reinforcing siliceous fillers are selected from colloidal silicas, powdered combustion silica and precipitated silica, and mixtures thereof.

These powders have a mean particle size generally of less than 0.1 μm and a BET specific surface area greater than 50 m²/g and preferably of between 100 and 300 m²/g.

Semi-reinforcing siliceous fillers, such as diatomaceous earths or ground quartz, can also be employed.

As far as non-siliceous mineral materials are concerned, these can be used as semi-reinforcing or bulking mineral fillers. Examples of these non-siliceous fillers, which can be used by themselves or in a mixture, are carbon black, titanium dioxide, aluminum oxide, hydrated alumina, expanded vermiculite, zirconia, a zirconate, non-expanded vermiculite, calcium carbonate, zinc oxide, mica, talcum, iron oxide, barium sulfate and slaked lime. These fillers have a particle size generally of between 0.01 and 300 μm and a BET surface area of less than 100 m$^2$/g.

For practical purposes, but without implying a limitation, the filler employed is a silica.

The filler can be treated with an appropriate compatibilizing agent, especially hexamethyldisilazane. For further details on this subject, reference may be made e.g. to patent FR-B-2 764 894.

It is preferable to use the filler in an amount of between 5 and 30 and preferably of between 7 and 20% by weight, based on all the constituents of the preparation.

As regards the functional additives H which can be used, these can be covering products, e.g. pigments/colorants, or stabilizers.

In the process according to the invention, it is also possible to use a two-component system as a precursor for the preparations. This two-component system is characterized in that:
   it is in two separate parts P1 and P2 which are intended to be mixed in order to form the composition and one of these parts P1 and P2 comprises the catalyst C and a single polyorganosiloxane species A or B; and
   the part P1 or P2 containing the polyorganosiloxane B is devoid of the component (F.3) of the promoter F.

Thus the composition can consist e.g. of a part P1 comprising the components (F.1) and (F.2), while the part P2 contains the component (F.3).

To obtain the two-component silicone elastomer composition P1-P2.

In the case where a filler is used, it is advantageous firstly to prepare a primary paste by mixing a mineral filler, at least part of the POS B and at least part of the polyorganosiloxane A.

This paste serves as a base for obtaining on the one hand a part P1 resulting from the mixing of said paste with the polyorganosiloxane B, optionally a crosslinking inhibitor and finally the components (F.1) and (F.2) of the promoter F. The part P2 is produced by mixing part of the aforementioned paste with polyorganosiloxane A, catalyst (Pt) and component (F.3) of the promoter F.

The viscosity of the parts P1 and P2 and their mixture can be adjusted by altering the amounts of the constituents and choosing polyorganosiloxanes of different viscosity.

In the case where one or more functional additives H are employed, they are divided up between the parts P1 and P2 according to their affinity for the contents of P1 and P2.

Once they have been mixed with one another, the parts P1 and P2 form a ready-to-use silicone elastomer preparation (RTV-2) which e.g. can be applied to a substrate by any appropriate impregnating means (for example padding) and optionally any appropriate coating means (for example a knife or cylinder).

The invention also provides a crosslinked elastomer composite or coating obtainable by one of the processes defined above, characterized in that it has an adhesive strength, measured by a peel test T, greater than 2.7 N/cm, preferably greater than or equal to 2.8 N/cm and particularly preferably of between 3 and 10 N/cm.

To the inventors' knowledge, such high adhesive strength values have never before been achieved for the silicone surface of a composite of this type, since plasma treatment has never before been envisaged for silicone crosslinked especially by polyaddition.

Figure 1:
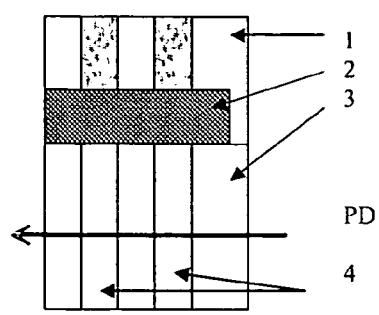
FIG. 1 is a diagram of the device used for the peel test, showing the assembly of two silicone-coated substrates by adhesive bonding via their silicone coatings, on which strips treated according to the invention and untreated control strips are placed in succession.

The Examples given below demonstrate the performance of the process according to the invention and its advantages compared with the prior art.

EXAMPLE I

I.1 Preparation, Forming and Crosslinking of a Silicone Composition

The composition is question is a silicone composition deposited in a thin layer on a voile.

The voile is a polyamide 66 fabric of 470 dtex.

It is knife-coated with 50 g/m$^2$ of silicone; the silicone part is crosslinked by passage through an oven at 160° C. for 2 minutes.

The silicone composition is obtained by gradually mixing the following components in the indicated proportions (parts by weight) in a reactor at room temperature:
   47.7 parts of a resin M M(Vi) D(Vi) DQ containing about 0.6% of Vi,
   30.6 parts of α,ω-diMeVi-polydimethylsiloxane (PDMS) of viscosity 100 Pa·s, containing about 0.08% of Vi,
   15 parts of α,ω-diMeVi PDMS of viscosity 10 Pa·s, containing about 0.135% of Vi,
   5 parts of poly(diMe) Methyldrogenosiloxy-α, ω-diMethlhydrogenosiloxane of viscosity 25 mPa·s, containing 20% of =Si—H,
   0.023 part of ethynylcyclohexanol,
   0.91 part of vinyltrimethoxysilane,
   0.91 part of 3-glycidoxypropyltrimethoxysilane,
   0.36 part of butyl titanate,
   0.02 part of Karstedt platinum crosslinking catalyst.

The composite is prepared several days before the experiment.

Legend

The siloxy units M, D, T and Q of the above POS are defined as follows:
   unit M=R$_3$SiO$_{1/2}$
   unit D=R$_2$SiO$_{2/2}$
   unit T=RSiO$_{3/2}$
   unit Q=SiO$_{4/2}$ The radicals R are identical or different and are an alkyl radical (e.g. methyl, ethyl, isopropyl, tert-butyl, n-hexyl), a hydroxyl or an alkenyl (e.g. vinyl, allyl).

Me=methyl; Vi=vinyl.

I.2. Surface Treatment

The treatment is effected by means of an atmospheric plasma torch from PLASMA TREAT®. These torches operate in air; a rotating device makes it possible to treat a 40 mm strip.

The torch is positioned above the substrate to be treated, which is moved at an imposed speed. The chosen conditions are:

| | |
|---|---|
| Condition 1 = distance | 10 mm; speed 5 m/min. |
| Condition 2 = distance | 6 mm; speed 4 m/min; 2 passes. |

I.3 Evaluation of the Surface Energy

The surface energy of the substrates is estimated from the spreadability of inks of various surface tensions.
The following results are obtained:

| | |
|---|---|
| Initial | <30 mN/m (expected 21 mN/m) |
| Condition 1 immediate measurement | 32-36 mN/m |
| Condition 2 immediate measurement | ~72 mN/m |
| Condition 2 measurement after 30 min | 32-36 mN/m |

I.4 Peel Test

The adhesive bonding performance is assessed by means of a quantitative peel test under the conditions below.

Figure 2:
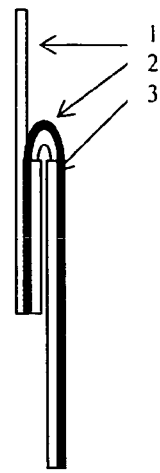
FIG. 2 is a diagram showing the so-called 180° peel conditions.

A uniform layer of 50 g/m² of silicone adhesive is deposited on the silicone-coated side of a first substrate, and the silicone-coated side of the second substrate is then applied to this layer of adhesive. Care is taken to ensure that the strips corresponding to the treatment effected by the plasma torch are properly superimposed as in the diagram of FIG. 1 attached, in which:
Reference 1 corresponds to the first substrate.
Reference 2 corresponds to the adhesive.
Reference 3 corresponds to the second substrate.
Reference PD corresponds to the peel direction.
Reference 4 corresponds to the treated zones.
The adhesive used has the following formulation:
49 parts of a resin M M(Vi) D(Vi) DQ containing about 0.9% of Vi,
14.2 parts of α,ω-diMeVi PDMS of viscosity 10 Pa·s, containing about 0.135% of Vi,
31.6 parts of a ground silica of mean particle size about 2 μm,
2.8 parts of poly(diMe) (Methylhydrogenosiloxy)-α,ω-diMethyihydrogenosiloxane of viscosity 25 mPa·s, containing 20% of Si—H,
0.02 part of ethynylcyclohexanol,
0.9 part of vinyltrimethoxysilane,
0.9 part of 3-glycidoxypropyltrimethoxysilane,
0.35 part of butyl titanate,
0.02 part of platinum crosslinking catalyst.
The composite tested is produced 24 h after treatment of the substrates under the plasma torch. The whole of the composite prepared in this way is baked for 3 min at 160° C. under a slight pressure.
The assembly is tested under peel conditions T at 180° using a tensile tester whose crosshead moves at a constant speed of 50 mm/min.
FIG. 2 attached illustrates this peel test T.
The adhesion values are expressed in N/cm.
The repeatability of the test was evaluated as ±3.5%.

I.5 Peel Result

Figure 3:
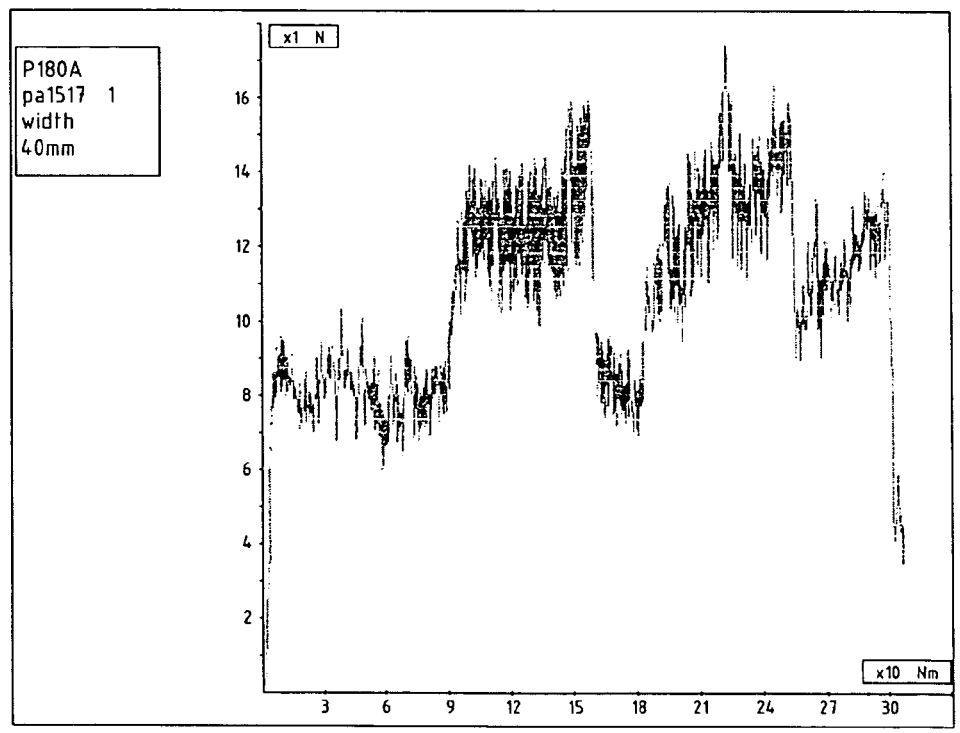
FIG. 3 shows the graph of the adhesive strengths measured in the peel test.

The recorded graph of the peel experiment is reproduced in FIG. 3 attached. It clearly shows higher adhesive strengths for the treated strips.

The adhesive strength values taken from this graph are shown in Table 1 below.

TABLE 1

| Treated surface | Treatment parameters | Peel strength (N) | Type of break |
|---|---|---|---|
| Silicone on PA 66 fabric | No treatment | 2.1 | EB |
| | Treatment under condition 1 | 3.3 | EB |
| | No treatment | 2.2 | EB |
| | Treatment under condition 2 | 3.5 | EB |
| | No treatment | 2.7 | EB |

There is no clear effect of the treatment intensity, and the break remains adhesive; however, given that the evaluation is made very late, this result is still extremely positive.

In fact, it is seen that the surface modification rapidly disappears; nevertheless, 24 hours later, the peel strength in the treated zones is still 50% higher than in the untreated zones.

The invention claimed is:

1. Process for the surface treatment of an article containing crosslinked silicone, selected from polyorganosiloxanes (POS) crosslinked by the polyaddition of ≡Si—H units onto ≡Si-alkenyl units, obtained from a silicone preparation comprising:
   at least one polyorganosiloxane (POS) A with ≡Si-alkenyl units,
   at least one polyorganosiloxane (POS) B with ≡Si—H units,
   at least one metal catalyst C,
   optionally at least one POS resin D carrying ≡Si-alkenyl units,
   optionally at least one crosslinking inhibitor E,
   optionally at least one adhesion promoter F,
   optionally at least one mineral filler G,
   optionally at least one functional additive H for imparting specific properties, wherein:
      said process comprises spraying at least one plasma jet onto at least part of the silicone surface of said article, the plasma used is a homogeneous atmospheric plasma, and it is carried out continuously by means of a plasma spraying apparatus comprising a rotating head having one or more plasma nozzles that are offset relative to the axis of rotation, each one being capable of generating a plasma jet whose axis is parallel to said axis of rotation.

2. Process for the production of a crosslinked silicone article which has been treated by the process according to claim 1, comprising:
   (I) forming a silicone element with a liquid silicone preparation as defined in claim 1;
   (II) crosslinking this liquid silicone preparation formed in step (I);
   (III) treating at least part of the crosslinked silicone surface with a plasma;
   (IV) repeating steps (I) and (II).

3. Process according to claim 1, wherein the quantity of plasma received by the silicone surface is such that the energy of said surface is greater than 30 mN/m.

4. Process according to claim 1, wherein the article containing silicone includes a substrate and one or more crosslinked silicone elements forming a monolayer or multilayer coating adhering to the substrate.

5. Process according to claim 1, wherein the article containing silicone is a silicone mold or molded object.

6. Process for the assembly of articles containing crosslinked silicone selected from polyorganosiloxanes (POS) crosslinked by the polyaddition of ≡Si—H units onto ≡Si-alkenyl units, wherein at least one of the articles to be assembled is derived from the process according to claim 1, and wherein said articles are assembled using liquid adhesive which is applied to at least part of the treated silicone surfaces.

7. Process according to claim 1, wherein the chosen POS A have siloxy units of the formula:

$$W_a Z_b SiO_{(4-(a+b))/2} \quad (1)$$

in which:
the symbols W, which are identical or different, are each an alkenyl group;
the symbols Z, which are identical or different, are each a non-hydrolyzable monovalent hydrocarbon group that is devoid of an unfavorable action on the activity of the catalyst, and is optionally halogenated;
a is 1 or 2, b is 0, 1 or 2 and a+b is between 1 and 3;
optionally at least some of the other units are units of the empirical formula $$Z_c SiO_{(4-c)/2} \quad (2)$$

in which Z is as defined above and c has a value of between 0 and 3.

8. Process according to claim 1, wherein the chosen POS B has siloxy units of the formula:

$$H_d L_e SiO_{(4-(d+e))/2} \quad (3)$$

in which:
the symbols L, which are identical or different, are each a non-hydrolyzable monovalent hydrocarbon group that is devoid of an unfavorable action on the activity of the catalyst, and is optionally halogenated;
d is 1 or 2, e is 0, 1 or 2 and d+e has a value of between 1 and 3;
optionally at least some of the other units being units of the empirical formula $$L_g SiO_{(4-g)/2} \quad (4)$$

in which L is as defined above and g has a value of between 0 and 3.

9. Process according to claim 1, wherein the alkenyl groups W of the POS A and/or of the POS resins D are vinyl groups Vi carried by siloxy units D and optionally M and/or T.

10. Crosslinked silicone elastomer coating obtainable by the process according to claim 1, wherein said coating has an adhesive strength, measured by a peel test T, greater than 2.7 N/cm.

11. The process of claim 1, wherein said ≡Si-alkenyl units comprise ≡Si-vinyl units.

12. The process of claim 3, wherein said energy is between 30 and 70 mN/m.

13. The process of claim 4, wherein said substrate is flexible.

14. The process of claim 7, wherein said alkenyl group comprises $C_2$-$C_6$ alkenyl.

15. The process of claim 7, wherein said non-hydrolyzable monovalent hydrocarbon group is selected from alkyl groups having from 1 to 8 carbon atoms inclusive and from aryl groups.

16. The process of claim 8, wherein said non-hydrolyzable monovalent hydrocarbon group is selected from alkyl groups having from 1 to 8 carbon atoms inclusive and from aryl groups.

17. The process of claim 10, wherein said coating has an adhesive strength, measured by a peel test T, of between 3 and 10 N/cm.

18. Method for improving the adhesive performance characteristics of crosslinked silicone surface selected from polyorganosiloxanes (POS) crosslinked by the polyaddition of ≡Si—H units onto ≡Si-alkenyl units, obtained from a silicone preparation comprising:
at least one polyorganosiloxane (POS) A with ≡Si-alkenyl units,
at least one polyorganosiloxane (POS) B with ≡Si—H units, at least one metal catalyst C,
optionally at least one POS resin D carrying ≡Si-alkenyl units,
optionally at least one crosslinking inhibitor E,
optionally at least one adhesion promoter F,
optionally at least one mineral filler G,
optionally at least one functional additive H for imparting specific properties,
wherein said method comprises spraying at least one plasma jet onto at least part of the silicone surface of said article,
wherein the plasma used is a homogeneous atmospheric plasma, and
wherein said method is carried out continuously by means of a plasma spraying apparatus comprising a rotating head having one or more plasma nozzles that are offset relative to the axis of rotation, each one being capable of generating a plasma jet whose axis is parallel to said axis of rotation.

* * * * *